United States Patent [19]
Witschonke et al.

[11] 3,988,277
[45] Oct. 26, 1976

[54] STABILIZED MANNICH BASE SOLUTIONS
[75] Inventors: Charles Richard Witschonke, Noroton; Robert Rabinowitz, Stamford, both of Conn.
[73] Assignee: American Cyanamid Company, Stamford, Conn.
[22] Filed: Nov. 21, 1974
[21] Appl. No.: 526,023

[52] U.S. Cl. ............... 260/29.6 AT; 260/29.6 N; 260/29.6 MN; 260/29.6 H; 260/29.6 CM
[51] Int. Cl.² .......................................... C08K 5/31
[58] Field of Search ............ 260/29.6 HN, 29.6 N, 260/29.6 MN, 29.6 H, 29.6 CM, 29.6 AT, 89.7 S, 89.7 N

[56] References Cited
UNITED STATES PATENTS

| 3,072,587 | 1/1963 | Perkins | 260/29.6 N |
| 3,174,874 | 3/1965 | Fikentscher | 260/29.6 HN |
| 3,234,163 | 2/1966 | Schurz | 260/89.7 S |
| 3,235,523 | 2/1966 | Schurz | 260/29.6 N |
| 3,323,979 | 6/1967 | Foster | 260/89.7 S |
| 3,349,121 | 10/1967 | Muller | 260/89.7 S |
| 3,658,734 | 4/1972 | Pettitt | 260/29.6 HN |

Primary Examiner—Paul R. Michl
Attorney, Agent, or Firm—William J. van Loo

[57] ABSTRACT

Aqueous solutions of Mannich bases of polyvinylamides are stabilized against viscosity increase and gelation by addition thereto of an effective amount of a formaldehyde scavenger.

10 Claims, No Drawings

STABILIZED MANNICH BASE SOLUTIONS

This invention relates to a polymeric Mannich base in aqueous solution stabilized against viscosity increase and gelation. More particularly, the invention relates to an aqueous solution of a Mannich base of a water-soluble polymer stabilized against viscosity increase and gelation by addition thereto of an effective amount of a suitable aldehyde scavenger.

The Mannich reaction is the condensation of an amine and an aldehyde with a compound containing an acidic hydrogen atom attached to a carbon or nitrogen atom. A Mannich base is the reaction product obtained from the specified reaction. In instances where the Mannich base is water-soluble, the product is of cationic nature and, thus, is termed a base. The Mannich reaction, therefore, is a manner whereby a compound which is not cationic by nature can be rendered cationic. The Mannich reaction is employed to modify a number of compounds which may be of monomeric or polymeric structure.

A particular application of the Mannich reaction is in the modification of water-soluble nonionic polymers so as to render them cationic. Particular examples involve modification of nonionic water-soluble polyvinylamides to render them substantive to anionic paper-making fibers and of similar polymers to render them effective flocculants for aqueous suspensions of finely divided negatively-charged solids.

Water-soluble polyvinylamides modified by the Mannich reaction are conveniently supplied as aqueous solutions of limited concentration. Such solutions normally have a moderate viscosity as prepared for ease of handling. However, as these solutions age, their viscosity increases rapidly and eventually a useless gel is obtained. Moreover, even before the gel state is reached, the solution viscosity can be too great for effective use.

It is generally believed that an aqueous solution of a Mannich base is in a constant state of decomposition and recombination. Although no problem will arise if recombination leads to the original reaction product, a problem arises when recombination leads to a different reaction product. In the case of water-soluble polyvinylamides which have been modified by reaction with an aldehyde and an amine to form a Mannich base, it is possible for the aldehyde to react with two amide groups rather than one amide group and one amine group, especially upon decomposition and recombination during aging of the initial Mannich base as an aqueous solution. If the two amide groups arise from two different polymer chains, interaction of the aldehyde therewith results in crosslinking. Increasing degrees of crosslinking lead to increased solution viscosity and eventual gelation of the solution.

Although the increases in solution viscosity and eventual gelation may arise in an alternative manner, nevertheless such tendencies of the solutions of polyvinylamide Mannich bases create difficult problems to manufacturers and users thereof. For example, because of the limited stability of the solutions of such Mannich bases, the manufacturer cannot inventory such solutions to any great extent, but must generally make them fresh as required. For the same reason, users of the solution will generally limit their orders to just as much solution as can be used well within the stable period. Even within the useful stable period, considerable changes in solution viscosity can change performance characteristics with respect to particular uses. For certain uses, for example, a relatively high solution viscosity of a given solution of polyvinylamide Mannich base is desirable. However, Mannich bases of polyvinylamides prepared to have the desired high solution viscosity generally form solutions which gel in extremely short times, thereby intensifying the stability problem. Thus, it is not only desirable to stabilize a solution of a polyvinylamide Mannich base against gelation, but also against rapid viscosity increase.

Accordingly, there exists the need for a stable aqueous solution of a Mannich base of a polyvinylamide so as to overcome deficiencies of conventional products.

It is, therefore, a primary object of the present invention to provide an aqueous solution of a Mannich base of a polyvinylamide that has improved stability against viscosity increase and gelation.

In accordance with the present invention, there is provided an aqueous solution of a Mannich base of a polyvinylamide containing a stabilizing amount of a formaldehyde scavenger.

The present invention provides an aqueous solution of a Mannich base of a polyvinylamide stabilized against viscosity increase and gelation. In preferred embodiments, the solutions of the present invention require up to about five times as long to undergo a given viscosity increase as do conventional solutions of the same base. Similarly, the time required for gelation of the preferred solutions of the present invention is about five times as long as that of conventional solutions. Performance characteristics of the solutions of the invention are unaffected by the presence of the formaldehyde scavenger.

The polyvinylamides used to prepare the Mannich bases dissolved in the solutions of the present invention may contain repeating polymer units derived from ethylenically unsaturated amides undergoing vinyl-type polymerization such as acrylamide, methacrylamide, ethacrylamide, and the like. In addition, the polyvinylamides may contain repeating polymer units derived from monomers copolymerizable with the vinylamide so long as such units do not adversely affect the ability of the resulting copolymer to form a water-soluble Mannich base. Thus, minor amounts of comonomers such as acrylonitrile, styrene, and the like may be present in the polyvinylamide.

The polyvinylamide may be any of the type that is conventionally used in the preparation of Mannich bases are, therefore, necessary with respect to the polyvinylamide composition or mode of preparation, which is also conventional. Preferably, the polyvinylamide is a water-soluble polymer of acrylamide and has a molecular weight in excess of about 100,000, preferably in excess of about 1,000,000.

Modification of the polyvinylamide to provide the Mannich base will be by conventional procedures so that no new teachings in this respect are necessary. Preferably, the polyvinylamide will be modified by reaction with formaldehyde and dimethylamine, which may be pre-reacted prior to reaction with the polyvinylamide. Also preferably, the amount of formaldehyde to amine will be equimolar in preparing the pre-reaction product and use of the pre-reaction product will be equimolar to the amide content of the polyvinylamide, i.e., sufficient methylol amine is used to provide one dimethylaminomethyl group for each amide group present in the polyvinylamide.

The Mannich reaction product of the polyvinylamide is typically prepared as an aqueous solution and it is such aqueous solution with which the present invention is concerned. The particular concentration of Mannich base in aqueous solution will generally vary widely depending upon the molecular weight of the polymer and the effect thereof on solution viscosity. Generally such solutions are initially prepared at a concentration which will provide a solution viscosity which permits facile handling of the solutions for the various applications intended. In view of the known tendency for such solutions to rapidly increase in viscosity upon standing, the initial concentration of Mannich base present therein is suitably adjusted to provide a reasonable period of facile use before undue viscosity increases arise. The solution viscosity at a given concentration of Mannich base increases with increasing molecular weight of the polymer employed to prepare the Mannich base. Since the polyvinylamides useful in preparing Mannich bases may have a wide range of molecular weights, as indicated, the concentration of Mannich bases in the solutions with which the present invention will also vary widely. The present invention is effective over the range of concentrations of Mannich bases in aqueous solution that is conventionally encountered in the products sold for various applications. It is understood, of course, that the product solutions are extensively diluted when employed in specific applications and stability is not a problem of the highly diluted products in actual use.

In carrying out the present invention, a conventional aqueous solution of a Mannich base of a polyvinylamide is selected and in the solution is dissolved an effective amount of a formaldehyde scavenger. The resulting solution, containing both the Mannich base and the formaldehyde scavenger in solution, shows a reduced tendency to increase in viscosity and, accordingly, is improved in stability against gelation. A particular solution, with a solution viscosity within a specific range, will retain its viscosity within this range for a longer time period when the formaldehyde scavenger is present than when the scavenger is not employed.

Formaldehyde scavengers which have been found effective in stabilizing aqueous solutions of Mannich bases of polyvinylamides include hydrazine, ammonia, morpholine, guanidine, dimethylamine, urea, and the like. It is not known how these compounds stabilize the solutions but it is known that they are capable of interaction with formaldehyde. It is believed that these compounds are more mobile in solution than are the polyvinylamides. Although reactivity rate of formaldehyde with an amide may be greater than with these scavengers, it is believed that the greater mobility of the scavengers coupled with their ability to react with formaldehyde interferes with the ability of formaldehyde to cross-link the polyvinylamide molecules, and thus increases stability of the Mannich bases in solutions containing the scavengers. Thus, with respect to the formaldehyde scavengers, any that reduce the tendency of the solution of Mannich base of the polyvinylamide to increase in viscosity upon aging without interfering with the intended use of the Mannich base solution are useful.

The amount of formaldehyde scavenger that is useful in stabilizing a Mannich base solution according to the invention will vary widely depending upon many factors such as the nature of the Mannich base, the nature of the formaldehyde scavenger, and the degree of stabilization desired. Generally, effective stabilization is accomplished by use of from about 0.01 to 2.0 weight percent of formaldehyde scavenger based on the weight of the solution. However, in any case, the amount of formaldehyde scavenger to be employed is that amount which is effective to the extent desired and such amount can readily be determined by trial.

It is to be noted that certain of the formaldehyde scavengers may be in alternative forms, i.e., guanidine is conveniently used in the form of its salts such as guanidine nitrate and ammonia in the form of ammonium hydroxide.

It is possible to add the effective amount of formaldehyde scavenger to the Mannich base solution when the solution is freshly prepared or after the solution has aged for some time while achieving beneficial effects in accordance with the present invention. As previously indicated, it is generally desirable to prepare the Mannich base solution at concentrations which provide moderate solution viscosities for facile handling in applications thereof. However, in some applications improved performance may arise when a higher solution viscosity range is achieved upon aging. In such instances, addition of the formaldehyde scavenger can be delayed until the desired solution viscosity range is achieved and the scavenger will be effective in reducing the tendency of the solution to increase further in viscosity.

The invention is more fully illustrated in the examples which follow wherein all parts and percentages are by weight unless otherwise specified.

In illustrating the stabilizing effects of various additives in the following examples, a Mannich base of a polyacrylamide in aqueous solution was employed. This product was made according to conventional procedures, polymerizing acrylamide as a 4% aqueous solution to a molecular weight between 1,000,000 and 3,000,000 and subsequently reacting the polymer with a sufficient quantity of the reaction product of 1 mole of formaldehyde and 1 mole of dimethylamine to provide one mole of the reaction product per amide group of the polymer. Although the invention is illustrated with the Mannich base described, it is to be understood that the effective formaldehyde scavengers also stabilize solutions of Mannich bases of other polyvinylamides.

EXAMPLE 1

In portions of the aqueous solution of Mannich base described above were dissolved in separate runs varying quantities of guanidine nitrate. For comparison, an unmodified portion was also employed. Sufficient water was added to each sample so that they all were diluted to the same extent. These various portions were then aged at 37° C. with solution viscosities being determined at various aging times. The amounts of guanidine nitrate employed and the viscosity increases observed at the indicated time of aging are given in Table I.

TABLE I

| ADDITIVE AMOUNT (%)[1] | GUANIDINE NITRATE AS STABILIZER VISCOSITY INCREASE (%) DAYS STORED AT 37° C. | | | | |
| --- | --- | --- | --- | --- | --- |
| | 8 | 15 | 22 | 29 | 36 |
| None | 29 | 32 | 64 | 104 | XS[2] |
| 0.25 | 12 | 20 | 30 | 38 | 59 |
| 0.50 | 9 | 12 | 20 | 29 | 35 |

TABLE I-continued

| | GUANIDINE NITRATE AS STABILIZER | | | | |
|---|---|---|---|---|---|
| ADDITIVE | VISCOSITY INCREASE (%) | | | | |
| | DAYS STORED AT 37° C. | | | | |
| AMOUNT (%)[1] | 8 | 15 | 22 | 29 | 36 |
| 1.00 | 7 | 5 | 11 | 22 | 32 |

[1]Based on weight of Mannich base solution
[2]XS - Viscosity too great to measure The results show that guanidine nitrate reduces the tendency for the Mannich base solution to increase in viscosity at 37° C. and that increased usage of guanidine nitrate up to about 1.0% increases the effectiveness of stabilization.

EXAMPLE 2

The procedure of Example 1 was followed except that the storage temperature was 50° C. Results are given in Table II.

TABLE II

| | GUANIDINE NITRATE AS STABILIZER | | | | | |
|---|---|---|---|---|---|---|
| ADDITIVE | VISCOSITY INCREASE (%) | | | | | |
| | DAYS STORED AT 50° C. | | | | | |
| AMOUNT (%)[1] | 3 | 6 | 8 | 13 | 15 | 22 |
| None | 57 | XS[2] | — | — | — | — |
| 0.25 | 36 | 44 | 70 | XS | — | — |
| 0.50 | 37 | 49 | 61 | 116 | XS | — |
| 1.00 | 22 | 24 | 43 | 67 | 110 | XS |

(See Table I for superscripts)

These results show that guanidine nitrate reduces the tendency for the Mannich base solution to increase in viscosity at 50° C. and that increased usage of guanidine nitrate up to about 1.0% increases the effectiveness of stabilization.

EXAMPLE 3

The procedure of Example 1 was again followed except that the stabilizer employed was hydrazine. Results of storage at both 37° C. and 50° C. are given in Table III.

TABLE III

| | HYDRAZINE AS STABILIZER | | | | | | | |
|---|---|---|---|---|---|---|---|---|
| ADDITIVE | VISCOSITY INCREASE (%) | | | | | | | |
| | DAYS STORED | | | | | | | |
| AMOUNT (%) | 3 | 6 | 8 | 13 | 15 | 22 | 26 | 29 | 36 |
| | STORAGE TEMPERATURE 37° C. | | | | | | | |
| None | — | — | 29 | — | 32 | 64 | — | 104 | XS[2] |
| 0.05 | — | — | 12 | — | 21 | 32 | — | 28 | 42 |
| 0.10 | — | — | 7 | — | 23 | 35 | — | 47 | 57 |
| | STORAGE TEMPERATURE 50° C. | | | | | | | |
| None | 57 | XS | — | — | — | — | — | — | — |
| 0.05 | 35 | 53 | 61 | 94 | 112 | 127 | 134 | 127 | — |
| 0.10 | 34 | 47 | 53 | 83 | 85 | 103 | 108 | 106 | — |

(See Table I for superscripts)

The results show that hydrazine reduces the tendency of the Mannich base solution to increase in viscosity when stored at 37° C. and that little difference is shown in effectiveness at the two concentrations employed. The results also show the effectiveness of hydrazine as a stabilizer at 50° C., with the high concentration showing a slight advantage.

EXAMPLE 4

A 4% aqueous solution of acrylamide was polymerized in accordance with conventional procedures to provide a polyacrylamide having a molecular weight in the range of 1,000,000 to 3,000,000. Subsequently this polymer was reacted with the reaction product of 1 mole of formaldehyde and 1 mole of dimethylamine in varying portions, as shown in Table IV. The resulting reaction products as 3.6–3.95% aqueous polyacrylamide solutions were then stabilized using 1% guanidine nitrate based on the weight of the Mannich base solution. Stability was measured as the number of days to a specified increase in solution viscosity, the results of which are given in Table IV.

TABLE IV

| STABILITY OF MANNICH BASE SOLUTIONS AT 37° C. CONTAINING 1% GUANIDINE NITRATE | | | | |
|---|---|---|---|---|
| RATIO MDMA[1] | DAYS FOR VISCOSITY INCREASE OF | | | DAYS FOR 200% INCREASE OF CONTROL |
| PER N ATOM OF POLYACRYLAMIDE | 50% | 100% | 200% | |
| 0.90 | 37 | 42 | 45 | 4 |
| 0.75 | 35 | 38 | 41 | 6 |
| 0.50 | 14 | 19 | 24 | 2 |
| 0.25 | 9 | 12 | 16 | 5 |
| 0.10 | 6 | 10 | 17 | 6 |

[1]MDMA = Methylol Dimethylamine

These results show that guanidine nitrate increases the stability of the Mannich base solutions and that the stability is greater as the degree of Mannich base modification is increased.

EXAMPLE 5

The procedure of Example 4 was repeated except that the amount of guanidine nitrate was increased to 2%. Results are given in Table V.

TABLE V

| STABILITY OF MANNICH BASES AT 37° C. CONTAINING 2% GUANIDINE NITRATE | | | | |
|---|---|---|---|---|
| RATIO MDMA[1] | DAYS FOR VISCOSITY INCREASE OF | | | DAYS FOR 200% INCREASE OF CONTROL |
| PER N ATOM OF POLYACRYLAMIDE | 50% | 100% | 200% | |
| 0.50 | 19 | 25 | 36 | 8 |
| 0.25 | 16 | 20 | 24 | 5 |
| 0.10 | 15 | 22 | 30 | 6 |

[1]MDMA = Methylol Dimethylamine

The results show that the use of 2% guanidine provides somewhat better stability than does 1% guanidine nitrate, compare results of Tables IV and V.

EXAMPLE 6

Using the Mannich base employed in Example 1, a series of trials were made using varying amounts of different stabilizers. The actual runs and stability data are given in Table VI. The stability data given are in the form of the Stability Indices which are the number of days for a given increase in solution viscosity for a test sample divided by the number of days for the control (no stabilizer) to reach the same viscosity.

TABLE VI

STABILITY OF MANNICH BASE SOLUTIONS CONTAINING VARIOUS ADDITIVES

| STABILIZER | % | STABILITY INDEX FOR VISCOSITY INCREASE OF | | | | AGING TEMPERATURE |
| --- | --- | --- | --- | --- | --- | --- |
| | | 10% | 20% | 50% | 100% | |
| Guanidine Nitrate | .25 | 1.8 | 2.3 | 1.7 | 1.4 | 37° C. |
| '' | .50 | 3.5 | 3.7 | 2.2 | 2.1 | 37° C. |
| '' | 1.00 | 5.0 | 4.7 | 2.4 | 2.4 | 37° C. |
| '' | 2.00 | 20.0 | 9.5 | 3.2 | 2.7 | 37° C. |
| '' | 0.25 | 1.0 | 1.0 | 2.3 | 2.0 | 50° C. |
| '' | 0.50 | 1.0 | 1.0 | 2.0 | 2.4 | 50° C. |
| '' | 1.00 | 1.5 | 2.0 | 3.3 | 3.0 | 50° C. |
| Hydrazine | .05 | 1.4 | 1.5 | 2.1 | 2.5 | 37° C. |
| '' | .10 | 1.5 | 1.4 | 2.8 | 2.4 | 37° C. |
| '' | .15 | 4.0 | 4.0 | 2.3 | 2.8 | 37° C. |
| '' | .20 | 4.0 | 3.6 | 2.1 | 2.8 | 37° C. |
| '' | .23 | 6.3 | 4.7 | 2.7 | 2.7 | 37° C. |
| '' | .05 | 1.0 | 1.3 | 2.2 | 2.8 | 50° C. |
| '' | .10 | 1.0 | 1.3 | 2.8 | 4.2 | 50° C. |
| $NH_4OH$ | .30 | 1.6 | 1.5 | 1.4 | 3.5 | 37° C. |
| Morpholine | 1.00 | 1.4 | 1.3 | 2.0 | 2.9 | 37° C. |
| '' | 2.00 | 4.6 | 2.6 | 2.9 | 2.7 | 37° C. |
| Dimethylamine | 0.80 | 4.6 | 2.0 | 1.9 | 1.9 | 37° C. |
| Urea | 1.0 | 5.4 | 3.5 | 1.5 | 1.7 | 37° C. |
| '' | 1.5 | 5.4 | 3.4 | 1.4 | 1.6 | 37° C. |
| '' | 2.0 | 5.4 | 3.4 | 1.3 | 1.6 | 37° C. |

We claim:

1. An aqueous solution of a Mannich base of a polyvinylamide stabilized against viscosity increase and gelation containing a stabilizing amount of a formaldehyde scavenger.

2. The solution of claim 1 wherein said Mannich base is the reaction product of polyacrylamide, formaldehyde, and dimethylamine.

3. The solution of claim 1 wherein said formaldehyde scavenger is selected from guanidine, hydrazine, ammonia, morpholine, dimethylamine, and urea.

4. The solution of claim 1 wherein said formaldehyde scavenger is guanidine nitrate.

5. The solution of claim 2 wherein said formaldehyde scavenger is guanidine nitrate.

6. The solution of claim 1 wherein said formaldehyde scavenger is present in the amount of about 0.01 to 2.0 weight percent based on the weight of said solution.

7. The solution of claim 2 wherein said formaldehyde scavenger is selected from hydrazine, ammonia, morpholine, guanidine, dimethylamine and urea.

8. The solution of claim 2 wherein said formaldehyde scavenger is present in the amount of about 0.01 to 2.0 weight percent based on the weight of said solution.

9. The solution of claim 1 wherein said formaldehyde scavenger is hydrazine.

10. The solution of claim 2 wherein said formaldehyde scavenger is hydrazine.

* * * * *